(12) United States Patent
Shaikh et al.

(10) Patent No.: US 12,231,394 B2
(45) Date of Patent: *Feb. 18, 2025

(54) DEVICE IDENTIFICATION SYSTEMS

(71) Applicant: PAYPAL, INC., San Jose, CA (US)

(72) Inventors: Zahid Nasiruddin Shaikh, Timonium, MD (US); Srivathsan Narasimhan, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/609,751

(22) Filed: Mar. 19, 2024

(65) Prior Publication Data

US 2024/0305605 A1  Sep. 12, 2024

Related U.S. Application Data

(63) Continuation of application No. 18/192,642, filed on Mar. 30, 2023, now Pat. No. 11,968,171, which is a continuation of application No. 17/117,892, filed on Dec. 10, 2020, now Pat. No. 11,621,942, which is a continuation of application No. 16/680,421, filed on Nov. 11, 2019, now Pat. No. 10,893,020, which is a continuation of application No. 16/134,842, filed on Sep. 18, 2018, now Pat. No. 10,476,838, which is a continuation of application No. 15/084,400, filed on Mar. 29, 2016, now Pat. No. 10,079,851.

(51) Int. Cl.
*H04L 29/06* (2006.01)
*H04L 9/40* (2022.01)
*H04L 61/5007* (2022.01)
*H04L 101/659* (2022.01)

(52) U.S. Cl.
CPC ...... *H04L 61/5007* (2022.05); *H04L 63/1425* (2013.01); *H04L 2101/659* (2022.05)

(58) Field of Classification Search
CPC .......... H04L 61/5007; H04L 63/1425; H04L 2101/659
See application file for complete search history.

(56) References Cited

U.S. PATENT DOCUMENTS

| | | |
|---|---|---|
| 2004/0010683 A1 | 1/2004 | Huitema |
| 2008/0120707 A1 | 5/2008 | Ramia |
| 2009/0222891 A1 | 9/2009 | Heffez |
| 2010/0293094 A1 | 11/2010 | Kolkowitz et al. |
| 2012/0233665 A1 | 9/2012 | Ranganathan et al. |

(Continued)

*Primary Examiner* — William A Corum, Jr.
(74) *Attorney, Agent, or Firm* — HAYNES AND BOONE, LLP

(57) ABSTRACT

Methods and systems for a device identification system may be provided. The device identification system may determine an identity of a user device associated with a transaction. The identity may be determined by network address information, hard link information, soft link information, and/or other such information. The network address information may include IPv4 information, IPv6 information, a device ID, and/or other such information. The identity of the user device may be determined and a transaction conducted from the user device may be assigned a fraudulent transaction risk score according to the information. Transactions that are determined to be at a high risk of fraud may be reviewed or otherwise flagged and/or canceled.

20 Claims, 5 Drawing Sheets

(56) References Cited

U.S. PATENT DOCUMENTS

| | | |
|---|---|---|
| 2015/0006384 A1 | 1/2015 | Shaikh |
| 2016/0055487 A1 | 2/2016 | Votaw et al. |
| 2016/0071107 A1 | 3/2016 | Van |
| 2016/0162900 A1 | 6/2016 | Dutt et al. |
| 2017/0132636 A1 | 5/2017 | Caldera |
| 2017/0140386 A1 | 5/2017 | Kolkowitz et al. |
| 2017/0264600 A1 | 9/2017 | Froelicher et al. |
| 2020/0412767 A1* | 12/2020 | Crabtree ............ H04L 63/1441 |

* cited by examiner

DEVICE IDENTIFICATION SYSTEMS

CROSS-REFERENCE TO RELATED APPLICATIONS

This application is a continuation of U.S. patent application Ser. No. 18/192,642 filed on Mar. 30, 2024, entitled "DEVICE IDENTIFICATION SYSTEMS," which is a continuation of U.S. patent application Ser. No. 17/117,892 filed Dec. 10, 2020, entitled "DEVICE IDENTIFICATION SYSTEMS", issued Apr. 4, 2023 as U.S. Pat. No. 11,621,942, which is a continuation of Ser. No. 16/680,421 filed Nov. 11, 2019, entitled "DEVICE IDENTIFICATION SYSTEMS," issued Jan. 12, 2021 as U.S. Pat. No. 10,893,020, which is a continuation of U.S. patent application Ser. No. 16/134,842 filed Sep. 18, 2018, now U.S. Pat. No. 10,476,838, issued Nov. 12, 2019, which is a continuation of U.S. patent application Ser. No. 15/084,400 filed Mar. 29, 2016, now U.S. Pat. No. 10,079,851, issued Sep. 18, 2018, the contents of all of which are incorporated herein by reference in their entirety.

BACKGROUND

Field of the Invention

The present invention generally relates to systems for determining user device identities, and more particularly to systems utilizing IPv6 address structures to determine user device identities.

Related Art

Electronic devices such as computers, tablets, smartphones, smartwatches, and other devices may be used to conduct online (e.g., Internet) or electronic transactions. Accounts used in online transactions may be stolen, hacked, spoofed, or otherwise compromised. Such compromised accounts may then be used for fraudulent transactions.

Figure 1:
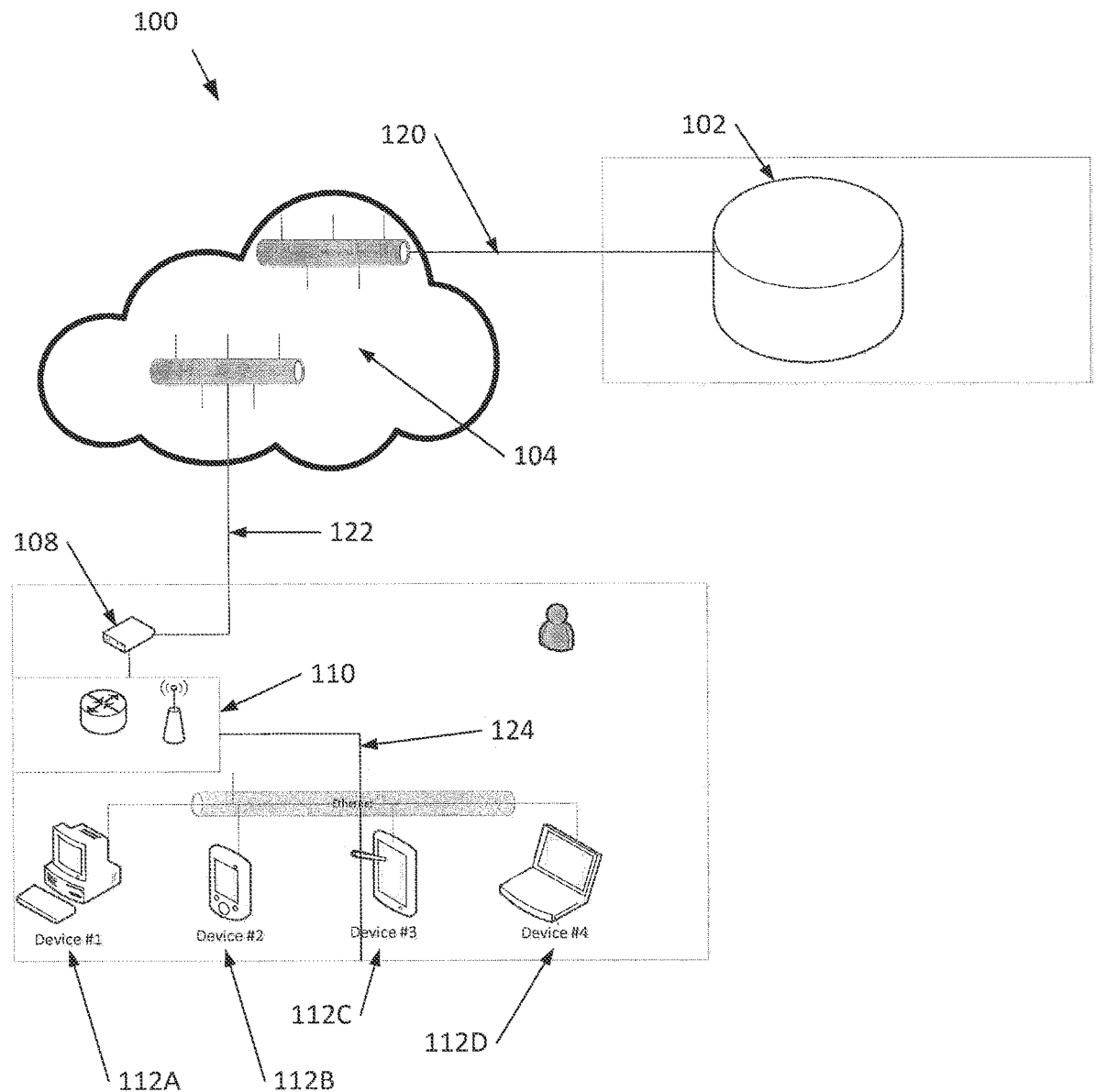
FIG. 1 is a block diagram showing a device identification system according to an embodiment of the disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods for determining user device identities. The present disclosure describes some embodiments of a device identification system that may include a transaction processing system, a communications system, and a user device. Other embodiments of the disclosure may additionally include a plurality of user devices, one or more routers or other network devices, and other additional systems and/or devices. The device identification system may receive transactional data from the user device. The transactional data may include network address information (e.g., Internet Protocol version 4, a.k.a. IPv4, address information, Internet Protocol version 6, a.k.a. IPv6, address information, address information associated with either IPv4 and/or 6 such as device identities ("IDs") and other network address information). The device identification system may then determine, from at least the transactional data, the identity of the user device, which may then identify the user associated or corresponding to the user device. The device identification system may identify a link between the user and the user device to, for example, aid in detecting fraudulent transactions. As such, the device identification system may identify a link between, for example, a user account and the user device. Accordingly, if the device identification system determines that a transaction is conducted with the user account from the user device, the device identification system may determine that the likelihood of a fraudulent transaction may be reduced. Conversely, if the device identification system determines that a transaction is conducted with the user account from a device that the user account is not linked with, the device identification system may determine that the likelihood of a fraudulent transaction is increased.

In certain embodiments, the device identification system may additionally receive other information such as information associated with the user device and/or a configuration of the user device including hard link information (e.g., device IDs, advertising IDs, mobile operator (or carrier) end points, phone numbers, and/or other such hard links) and/or soft link information (e.g., browser type, device name, operating system type, operating system model, operating system language, device model, specific device information, and/or other such soft links). The hard link and/or soft link information may additionally be used to determine the identity of the user and/or the user device. In certain embodiments, hard link information may include information associated with the user device that may be more difficult to change and, thus, harder to spoof (e.g., bypassing security measures via hacking or deceiving by imitating another person, software program, hardware device, or computer) than soft link information. Additionally, soft link information may include information associated with the user device that may be more susceptible to change and, thus, easier than hard link information to spoof. As such, matching hard link information may be more heavily weighted in determining the identity of a user device.

Online or internet communications, transactions, and commerce continues to increase in volume, which results in increasing fraudulent electronic activity and transactions. As such, increased fraud detection capabilities are valuable to provide security to users and online service providers, such as merchants, banks, health care providers, retailers, and any entity that communicates with users electronically through mobile applications, the internet, and the like. Additionally, lowering the frequency of false positives within fraud detection is also desirable. Capabilities allowing for improved accuracy in determining that an owner of an account is operating the account are thus desirable.

Additionally, internet protocols also continue to advance. Current IPv4 address structures are difficult to use to directly identify specific devices, making fraudulent account detection more difficult. As users often conduct transactions through only a specific number of devices, being able to directly identify specific devices and when a user is using the specific devices may allow for more accurate fraud detection. As such, when a user is detected to be using a device the user is historically associated with, the chances of a fraudulent transaction are lowered, and vice versa. IPv6 is an updated internet protocol and continues to gain in popularity due to, for example, IPv4 addresses being exhausted in countries worldwide, such as the United States. IPv6 is a 128 bit address that allows additional devices and/or users to communicate on the internet. Currently, the proportion of internet traffic utilizing IPv6 protocol is increasing. IPv6 may be communicated in a format that may include information directed towards one or more of a location, a specific device, and other information associated with a user device. In certain embodiments, IPv6 addresses may not utilize all 128 bytes of information and so may additionally include information directed towards, for example, hard link and/or soft ink information within the address. Such information may be additionally used to aid in the identification of the device. In certain embodiments, the techniques and systems disclosed herein may be used in other internet protocols. As such, 256 bit, 512 bit, 1,028 bit, and higher information internet protocol addresses may use the techniques and systems disclosed herein.

The present invention may be performed with certain device identification systems. FIG. 1 is a block diagram showing a device identification system according to an embodiment of the disclosure. While FIG. 1 describes certain components and systems to perform the techniques described herein, it is appreciated that other embodiments may include additional components, may include fewer components, or may include other components.

FIG. 1 shows a device identification system 100 that includes a transaction processing system 102, a communications system 104, a user network 108, a router 110, and user devices 112A-D. The transaction processing system 102 may be communicatively connected to the communications device 104 via a communications path 120. Communications path 122 may communicatively connect the communications device 104 to the user network 108. The user network 108 may be communicatively connected to the router 110 and the router 110 may be communicatively connected to the user devices 112A-D via the communications path 124.

The communications device 104 may be, for example, one or more servers associated with an IPv6 cloud and the transaction processing system 102 may receive information from the IPv6 cloud via the communications path 120 and stored within one or more databases. Information received may include, for example, transaction information received by the communications device 104 from one or more of the user devices 102A-D via the router 110 and/or the user network 108. The transaction processing system 102 may be configured to receive information from the communications device 104. The communications device 104 may receive information from a plurality of user networks, routers, and/or user devices and determine one or more transaction processing systems to communicate the information to.

Communications between the various systems described herein may be via one or more communications paths. The communications paths 120, 122, and/or 124 may be wired and/or wireless internet communications such as wired internet, broadband, satellite, Bluetooth, WiFi, NFC, 4G LTE or other data connections, phone and fax enabled communications, as well as other techniques of communications between devices.

A user may have, use, or operate the user devices 112A-D. The user devices 112A-D may be, for example, a smartphone, a personal data assistant, a tablet, a wearable electronic device (such as a smartwatch or electronically augmented glasses), a laptop, a desktop, or other electronic device. One or more of the user devices 112A-D may include user interfaces that may include a combination of one or more display screens, data entry devices such as a keypad or touch screen, buttons, facial or movement recognition abilities, or other items that allow a user to interface with one or more of the user devices 112A-D. The user may utilize one or more of the user devices 112A-D to conduct a transaction.

Figure 2:
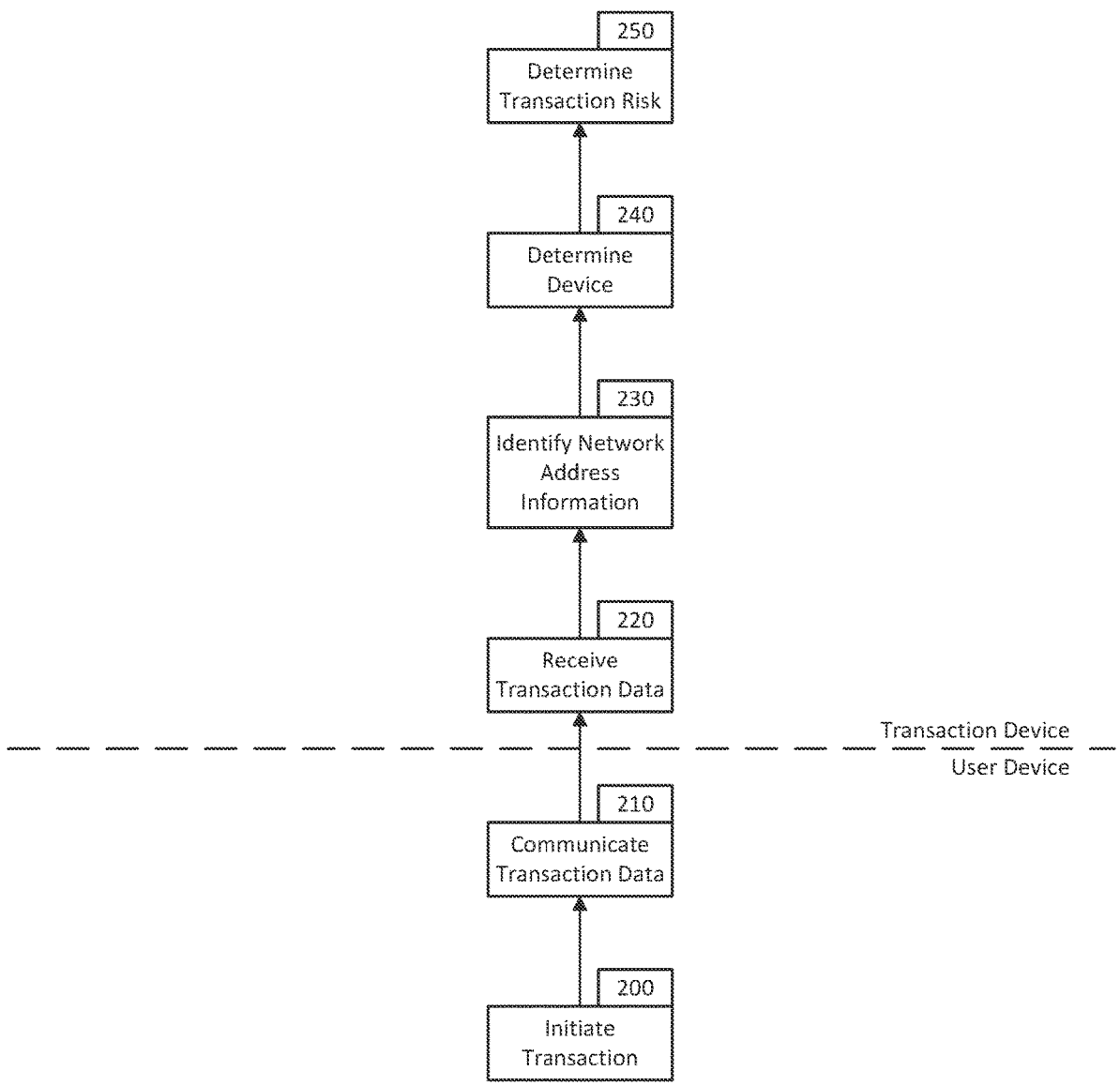
FIG. 2 is a flowchart showing a device identification process according to an embodiment of the disclosure.

FIG. 2 is a flowchart showing a device identification process according to an embodiment of the disclosure. FIG. 2 may illustrate the various steps of the process as performed by a user device (such as any of the user devices 112A-D) or a transaction device (such as the transaction processing system 102). In FIG. 2, blocks 200 and 210 may be performed by the user device while blocks 220, 230, and 240 may be performed by the transaction device. However, other embodiments may perform various steps of the process with other devices (e.g., block 230 may be performed by the user device or may be performed with a third device) or may include additional steps or less steps than that discussed in FIG. 2.

In block 200, a transaction is initiated. The transaction may be initiated by, for example, a user adding to an electronic shopping cart, checking out, dragging and dropping images of items for purchase, entering payment information, providing payment, communicating sensitive information, registering for an account, accessing an account or certain data, logging into an account, communicating with another party, requesting a service, moving into a geo-location vicinity of an instrumented network (e.g., a PayPal instrumented network), or otherwise selecting an item, service, or other product for purchase or creating a session with a payment service on the user device. This can be through a graphical user interface (GUI) on the user device, such as a touch screen or a screen that enables a cursor or mouse to be moved to desired locations and specific content selected on the screen through a mouse, touchpad, or other suitable mechanism. In block 210, the user device may communicate transaction data associated with the transaction to the transaction device. In certain embodiments, the transaction data may include, for example, network address information (e.g., IPv4 address information, IPv6 address information, address information associated with either IPv4 and/or IPv6 such as a device ID, and other network address information). The network address information may be information embedded within the transaction data. For example, certain embodiments may transmit network address information along with other information identifying the transaction amount, transaction items, the merchant, the user, and other information.

In block 220, the transaction data may be received by the transaction device. In block 230, the transaction device may identify the network address information. The transaction device may, for example, extract network address information embedded within the transaction data. As such, the transaction device may extract IPv6 information from transaction data communicated by the user device.

In block 240, the transaction device may determine the identity of the user device as well as, possibly, a location, a user, a configuration, or other information associated with the user device. The transaction device may determine the identity and other information from the transaction data, such as from the network address information. In certain such embodiments, such as embodiments where the network address information includes IPv6 information, the network address information may include information directed to, for example, the identity of the user and/or the user device, the location of the user device, or other such information. Such information directed to the identity of the user and/or the user device may include network address information, hard link information, soft link information, and/or other types of information directed towards the user device and/or network address.

In block 250, a transaction risk may be determined. The transaction risk may be determined by, for example, determining a likelihood of whether the transaction is fraudulent. The transaction risk may be determined from, for example, one or more of the identity of the user and/or the user device, the location of the user device, the configuration of the user device, the identity of the merchant, the items purchased, or other such information. Using this information, a sameness score (described below in detail) can be determined, which provides a measure of the transaction risk.

Figure 3:
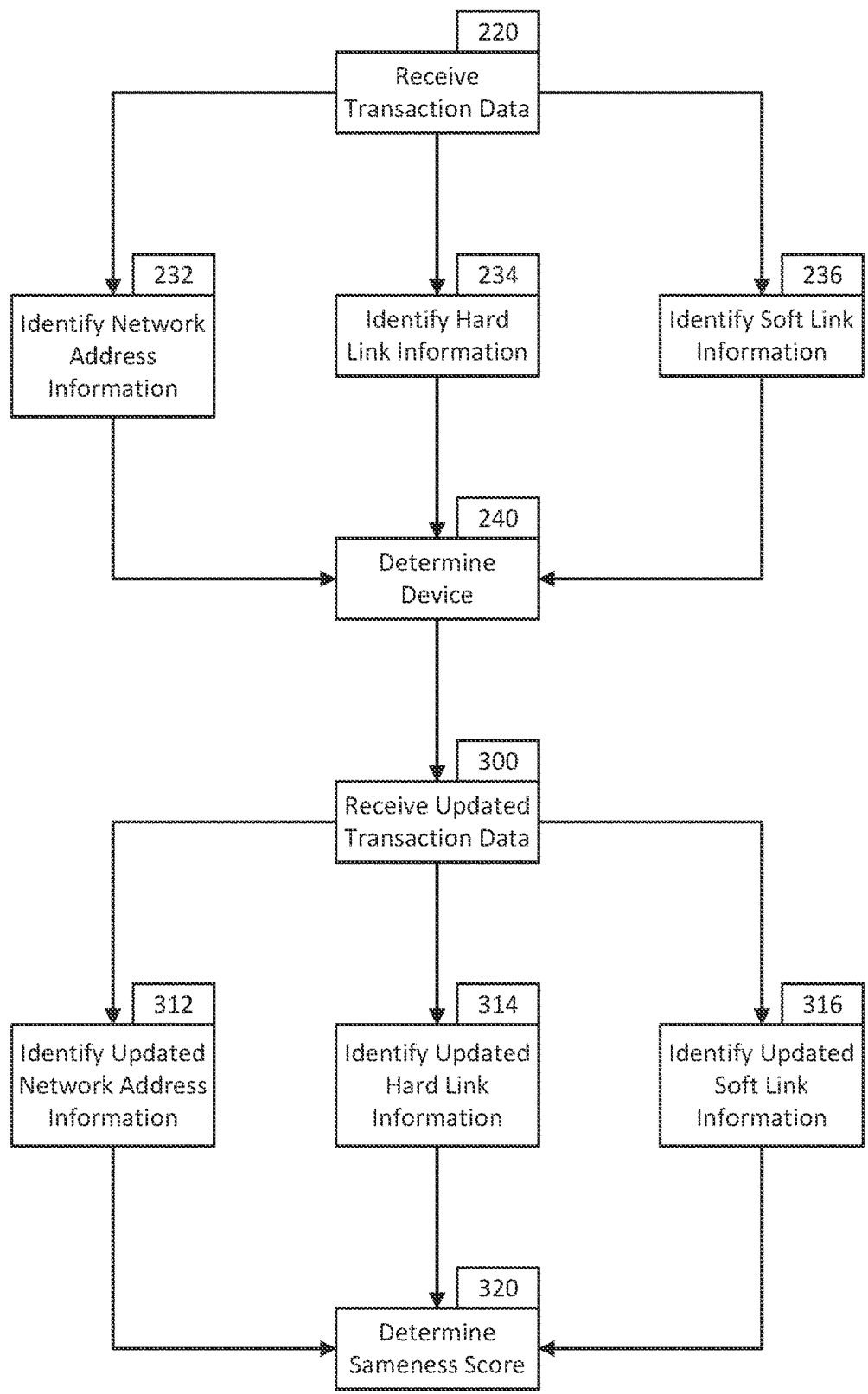
FIG. 3 is a flowchart showing a continued device identification process according to an embodiment of the disclosure.

FIG. 3 is a flowchart showing a continued device identification process according to an embodiment of the disclosure. The process in FIG. 3 may be performed by the transaction device to determine a sameness score for transaction data associated with two different transactions received from, ostensibly, the same user device. In certain embodiments, the sameness score may be associated with the transaction risk. That is, a lower sameness score may indicate a higher transaction risk while a higher sameness score may indicate a lower transaction risk. However, the transaction risk of certain embodiments may include factors additional to the sameness score. While the certain embodiments may calculate a sameness score and, thus, a transaction risk, for a later transaction of a plurality of transactions, other embodiments may alternatively or additionally calculate a sameness score and, thus, a transaction risk, for an earlier transaction of a plurality of transactions. Additionally, other embodiments may calculate a sameness score for a set of transactions and if the sameness score is below a threshold, all transactions within the set may be analyzed for fraudulent activity.

In block 220, transaction data may be received from a user device. Such transaction data may be associated with a first transaction. Block 220 of FIG. 3 may be similar to block 220 of FIG. 2. In the embodiment of FIG. 3, the transaction data may include, at least, network address information, hard link information, and soft link information. Network address information may include IPv4 address information, IPv6 address information, address information associated with either IPv4 and/or 6 such as a device ID (e.g., a MAC address) and other network address information. In certain embodiments, such as embodiments where the network address information includes IPv6 address information, the network address information may include information directed towards the identity of the user and/or the user device. In, for example, embodiments using IPv6, the IPv6 address may include a section of the address that specifies the identity of the user and/or the user device.

In certain such embodiments, the network address information such as an IPv6 address may be structured in groups of four or other amounts of hexadecimal digits within a 128-bit address. For example, the 128-bit address may be in the format of AA:BB:CC:DD:EE:FF:GG:HH, though certain other IPv6 addresses may be structured in other formats, such as formats with more layers or less layers. In certain IPv6 formats, certain layers may include data directed towards an end point unique key. The end point unique key may be data directed to the identity of the user device. As such, the end point unique key may specifically identify the user device. In certain IPv6 formats, specific layers may be directed towards the transport of hard link and/or soft link information. In certain such formats, the hard link and/or the soft link information may be transported within unused bytes of information and/or within optional bytes of information present within the IPv6 address format. In certain embodiments, the end point unique key may be determined from the hard link information and/or the soft link information, but other embodiments may include separate end point unique keys, hard link information, and/or soft link information within the IPv6 format. Certain such embodiments may use the end point unique key, the hard link, and/or soft link information to determine a unique end point address for the user device. In certain embodiments, the end point unique key, the hard link, and/or the soft link information may be scrambled and/or encrypted. Such scrambled and/or encrypted information may increase the difficulty of reverse engineering such information. As such, information related to the end point unique key, the hard link, and/or the soft link information may be embedded in any layer of the IPv6 address.

In block 232, the network address information within the transaction data may be identified and/or extracted. The transaction device may, after identifying and/or extracting the network address information, additionally identify and/or extract information identifying the user device from the network address information.

In block 234, hard link information within the transaction data may be identified and/or extracted. Hard link information may be, for example, attributes such as a device ID, advertising ID (e.g., an advertising ID communicated in the form of a cookie, token, or other format), phone numbers, and/or other such information that may be more difficult to change and/or spoof. A potential fraudster may, for example, spoof hard link and/or soft link information to appear as the user device or may spoof hard link and/or soft link information to attempt to convince the device identification system that it is detecting a false negative.

In block 236, soft link information within the transaction data may be identified and/or extracted. Soft link information may be, for example attributes such as browser type, device name, operating system type, operating system model, operating system language, device model, specific device information, and/or other such information that may be easier to change and/or spoof as compared to hard link information. In certain embodiments, hard link and soft link information may be differentiated by, for example, the persistence of the information. As such, as an illustrative example, hard link information may be user device information that a user may not typically change while soft link information may be user device information that a user may typically be able to change.

In block 240, the identity of the user device may be determined from the network address information, the hard link information, and/or the soft link information. For example, the transaction device may identify the user device from the network address information by, for example, matching the end point unique key within the network address information to a known end point unique key. Additionally, or alternatively, the hard link information and/or the soft link information may be used to identify the user device. For example, the hard link information may be matched with corresponding known hard link information (e.g., the device ID may be matched to a known device ID, the advertising ID may be matched to a known advertising ID, and/or the phone number may be matched to a known phone number and, accordingly, the identity of the user device may be identified as such) and/or the soft link information may be matched with corresponding known soft link information. Other embodiments may also, additionally or alternatively, include other information that may be used to identify the user device (e.g., such embodiments may determine a location of the user device and, at least partly, use the location to identify the user device).

After the device has been identified due to transaction data from the first transaction, transaction data associated with a second transaction may be received in block 300. The transaction data associated with the second transaction may be received in a manner similar to that of the transaction data associated with the first transaction (as described in block 220).

In blocks 312, 314, and 316, the network address information, hard link information, and soft link information of the second transaction may be identified and/or extracted from the transaction data associated with the second transaction. Blocks 312, 314, and 316 may be performed in a manner similar to that of the techniques described in blocks 232, 234, and 236.

In block 320, a sameness score may be determined. The sameness score may be determined by, for example, comparing transaction data associated with the first transaction to transaction data associated with the second transaction. As such, the network address information, the hard link information, and/or the soft link information, as well as other information, associated with the first and second transactions may be compared. The sameness score may be determined by, for example, an algorithm and/or formula. In such an example, the transaction device may match one or more information and/or data points of the network address information, hard link information, and/or soft link information. Each information and/or data point may increase the sameness score, while each non-matching information and/or data point may decrease the sameness score. In certain examples, the weighting of the categories may be different and so whether certain information and/or data points match may have a greater effect on the calculation of the sameness score than other information and/or data points. Additionally, in certain embodiments, whether a certain information and/or data point matches may increase or decrease the weighting of one or more other information and/or data points. Also, certain embodiments may include learning algorithms that change the weighting of one or more information and/or data points over time. Such changes may be made by factoring in previous decisions and/or outcomes and may be made to improve the accuracy of the sameness score.

In various embodiments, a priority may be established for the process of determining the sameness score. As such, if, for example, the IPv6 end point unique key (e.g., an end point unique key from IPv6 data, such as contained within, as an illustrative example, the EE:FF:GG:HH groups of the IPv6 data) of the first and second transactions are the same, then the sameness score may be high even if soft link information such as the operating system language is detected to have changed between the first and second transactions. However, if the soft link information is detected to be the same between the first and second transactions, but the IPv6 end point unique key is determined to be different in a period where the IPv6 end point unique key is not supposed to change, the sameness score may be low even though the soft link information is detected to be the same as soft link information may be more easily spoofed.

In an illustrative non-limiting example, the transaction device may match the IPv6 address, four hard link data points, and ten soft link data points. The sameness score may be a score from 0 to 1 points, inclusive. A matching IPv6 address may be worth 0.5 points, matching hard link data points may be worth 0.1 points each, and matching soft link data points may be worth 0.01 points each. As such, a matching IPv6 address, three matching hard link data points, and four matching soft link data points may result in a sameness score of 0.84. In certain other embodiments, if, for example, the IPv6 address does not match, matching hard link data points may be worth 0.1 points each with a 0.3 point bonus if all four matches, while matching soft link data points may be worth 0.02 points each. In such an example, the maximum sameness score if the IPv6 address does not match may be 0.9 points. In certain other such embodiments, if the transaction device determines that the IPv6 addresses have changed, then the bonus for matching all four hard link data points may be increased to 0.4 points so that a fully matching set of hard link and soft link data points may result in a sameness score of 1 as the IPv6 addresses are unlikely to match.

For example, the end point unique key of the network address information of the transaction data associated with the first and second transactions may be compared. Accordingly, if the same IPv6 end point unique key is detected within the network address information of the transaction data associated with the first and second transactions, the sameness score may be higher than if the end point unique key did not match. Additionally, if the IPv6 address indicated that the user device is conducting the first and second transactions from the same location, the sameness score may also be higher.

In certain embodiments, the end point unique key portion of the IPv6 address may change. For example, the end point unique key portion of the IPv6 address may change hourly, daily, weekly, or periodically according to another schedule. As such, in certain embodiments, the IPv6 address may, for example, change daily. In such embodiments, hard link and/or soft link information may be used additional or alternative to the end point unique key to determine the sameness score. As such, the hard link and/or soft link information of the first and second transactions may also be compared.

For example, if hard link information between the first and second transactions match, but the end point unique key is different, the sameness score may be higher than if the end point unique key and either or both of the hard link information and/or soft link information is different. Certain embodiments may determine when IPv6 addresses are set to change and, from such information, determine if a change in IPv6 is expected. As such, if the IPv6 address of a device changes when IPv6 addresses are scheduled to undergo a change, the sameness score may be higher.

By contrast, if the IPv6 address changes, but the hard link and/or soft link information stays the same, and no scheduled IPv6 change is determined for that period, the sameness score may be lower. As such, if the transaction device detects that a user device with the same hard link and/or soft link information is attempting to conduct transactions using multiple IPv6 addresses, a low sameness score may be assigned as, for example, the transaction device may determine that there is a high likelihood that the user device is spoofing multiple IPv6 addresses to conduct fraudulent transactions. Accordingly, the transaction device may associate the hard link and/or soft link information of that user device with a low sameness score.

As such, if the transaction device detects that the user device has the same device ID, advertising ID, and/or phone number when conducting the first and second transactions, the sameness score may be higher. However, if any one of the device IDs, advertising ID, and/or phone number is detected to be different between the first and second transactions, the sameness score may be lower. Additionally, the soft link information may also be compared between the first and second transactions. As an additional example, if the first and second transactions include matching data directed towards browser types, device names, operating system types, operating system models, operating system languages, device models, specific device information, and/or other such information, the sameness score may also be higher. Non-matching such information may lower the sameness score.

As an illustrative example, in the situational comedy Paid Pals, Kevin is an overworked doctor who has a sudden impulse to relieve his stress through retail therapy. As such, Kevin first uses his iPhone to make two transactions on the same day. The first transaction may be carried out in the morning, while the second transaction may be carried out in the afternoon. The IPv6 end point unique key may be embedded within the network address information transmitted with transaction data for each transaction. The transaction device may determine that the IPv6 end point unique key as well as other network address information may be the same for both transactions and that neither of the hard link nor soft link information has changed as well. Accordingly, the transaction device may assign a high sameness score to the second transaction.

Kevin then uses his iPhone to make a third transaction on the same day. However, the second transaction may have been performed by a first internet browser and the third transaction may have been performed by a second internet browser. Accordingly, the transaction device may then determine that, though the network address information and hard link information are the same for the two transactions, the different soft link information justifies a lower sameness score. However, the sameness score may still be a score indicating a low likelihood of fraudulent activity.

The next day, Kevin makes a fourth transaction. Between the third and four transaction, the network address information associated with Kevin's iPhone has changed (e.g., Kevin's iPhone has been assigned a new IPv6 end point unique key) due to a change specified by a periodic schedule. The transaction device detects that the IPv6 end point unique key has changed and then determines that the network address information has likely been changed due to the periodic schedule. The transaction device then determines that, though the network address information has changed, the hard link and soft link information has not changed. Accordingly, the transaction device may assign a relatively high sameness score to the fourth transaction despite the changed network address information.

That same day, after Kevin made his fourth transaction, his account information and his iPhone's soft link information gets stolen. The fraudster and/or hacker uses the soft link information to try to spoof Kevin's account on another device. The fraudster and/or hacker then attempts to conduct a transaction using the stolen account and soft link information. The transaction device receives the transaction data associated with the transaction and then detects that, though the account information and the soft link information are the same, the hard link information and the network address information are different. Additionally, the transaction device determines that the network address information indicates that the device conducting this transaction is located in an area that Kevin has no prior history of being at and is not expected to be at (such as based on Kevin's calendar or purchase history (e.g., travel to a specific location indicated by airplane tickets, hotel, car rental, or other travel related purchases). As such, the transaction device may then assign this new transaction a low sameness score and the transaction is flagged for review. (In certain embodiments, the transaction device may store locations that Kevin is typically at or expected to be. As such, if the transaction device detects that, instead of being at home, Kevin conducts a transaction at work, the sameness score assigned may be higher even if, for example, the user device and/or other information, such as system language or browser information, is different.)

After Kevin discovers that his iPhone has been stolen, he contacts authorities to report the theft and, with his shopping urge still not fully satisfied, he returns home to purchase more items with his laptop computer. A sixth transaction is then conducted with Kevin's laptop.

Previously, the transaction device had mapped the devices in Kevin's home. Using, at least, the network address information, the transaction device determined that the network address information indicated there are at least four devices in Kevin's home. For example, the transaction device may determine, from information indicating location of user devices, that there are at least a laptop, a smartphone, a tablet, and an internet-enabled television within Kevin's home. The transaction device determines that the network address information of the transaction data associated with the sixth transaction indicates that the sixth transaction was performed with the laptop. The hard link and soft link information also matches that of the laptop. Accordingly, though Kevin had not previously conducted any transactions through his laptop, the transaction device determines that the sameness score is high because information indicates that the laptop is being used to conduct the transaction and, thus, the possibility of fraudulent transaction is low.

Figure 4:
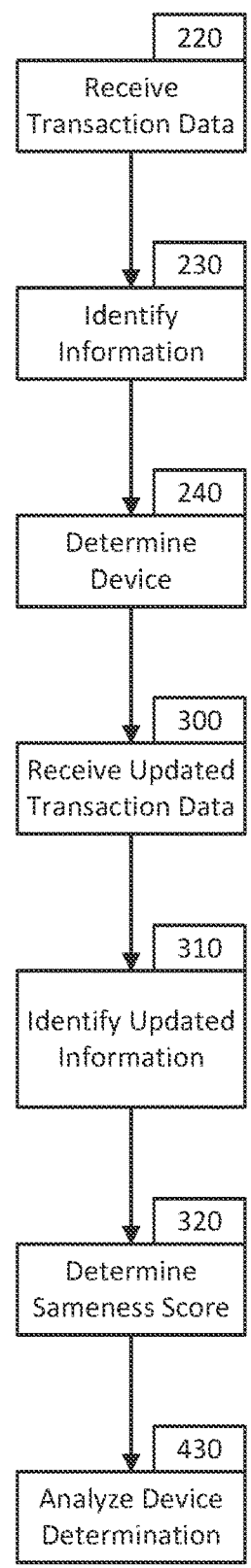
FIG. 4 is a flowchart showing an additional continued device identification process according to an embodiment of the disclosure.

FIG. 4 is a flowchart showing an additional continued device identification process according to an embodiment of the disclosure. Blocks 220, 240, 300, and 320 of FIG. 4 may be similar to blocks 220, 240, 300, and 320, respectively of FIG. 3. Block 230 of FIG. 4 may encompass any combination of blocks 232, 234, and/or 236, as well as other processes, of FIG. 3. Block 310 of FIG. 4 may encompass any combination of blocks 312, 314, and/or 316, as well as other processes, of FIG. 3.

In certain examples, the sameness score determined in block 320 may indicate that the transaction has a fraudulent transaction risk higher than a fraudulent transaction risk threshold. As such, the process may proceed to block 430, where information associated with the identity of the user device may be further analyzed. Such information may be further analyzed through additional techniques performed by the transaction device or another device and/or may be further analyzed through human review.

For example, human review may further analyze the network address information, the hard link information, and/or the soft link information to determine whether the transaction is fraudulent. Additionally or alternatively, the reviewer may contact the user of the user device to determine whether the transaction is fraudulent (e.g., by confirming whether the user committed the transaction) and/or whether the user device has been stolen. If human review determines that the transaction is fraudulent and/or the user device has been stolen, information associated with the user device, such as the network address information (e.g., IPv6 addresses, unique keys, and/or other information), hard link information, and/or soft link information may be flagged. As such, if additional transactions are determined to originate from the user device or a device spoofing the user device, the transaction may automatically be determined to be fraudulent and/or may automatically be flagged for human review.

Figure 5:
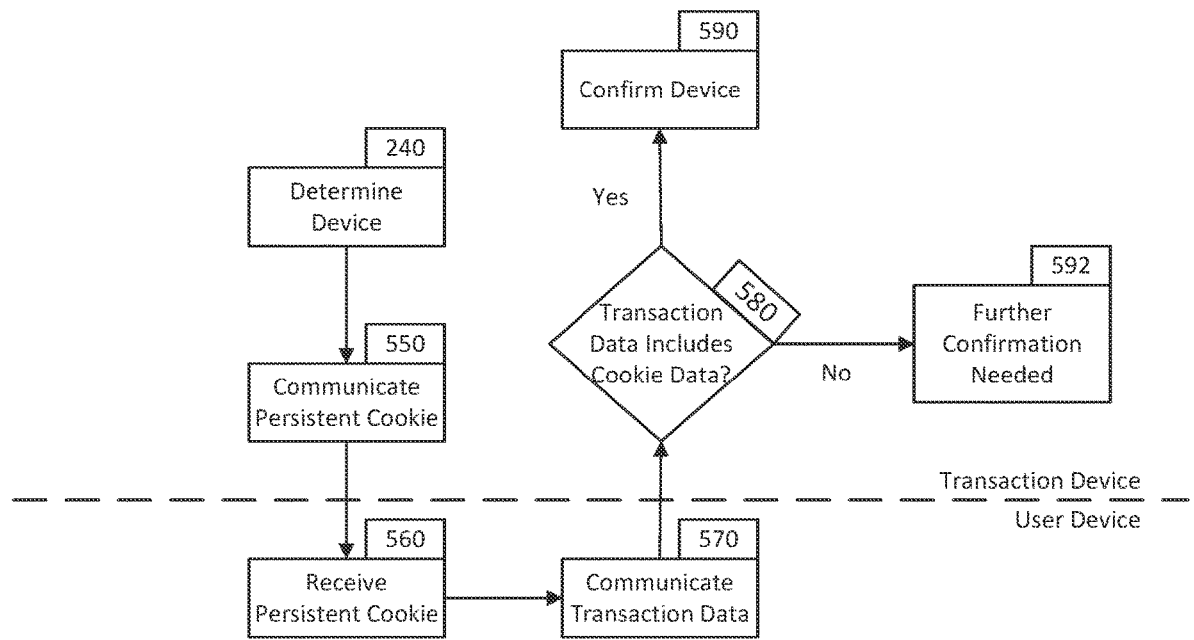
FIG. 5 is a flowchart showing a persistent cookie device identification process according to an embodiment of the disclosure.

FIG. 5 is a flowchart showing a persistent cookie device identification process according to an embodiment of the disclosure. FIG. 5 may illustrate the various steps of the process as performed by a user device (such as any of the user devices 112A-D) or a transaction device (such as the transaction processing system 102). In FIG. 5, blocks 560 and 570 may be performed by the user device while blocks 240, 580, 590, and 592 may be performed by the transaction device. However, other embodiments may perform various steps of the process with other devices or may include additional steps or less steps than that discussed in FIG. 5.

In block 240, the identity of the user device may be determined by the transaction device as well as, possibly, the location, user, configuration, or other information associated with the user device. Block 240 of FIG. 5 may be performed in a similar manner to that of block 240 of FIG. 2.

After the identity of the user device has been determined in block 240, a persistent cookie may be communicated to the user device in block 550. The persistent cookie may be an identification cookie or other packet and/or code that may be stored within one or more memory devices of the user device for an extended period of time (e.g., more than a day, more than five days, more than ten days, a month or more, a year or more, or another period of time). The persistent cookie may be configured to uniquely identify the user device. That is, the persistent cookie may, when received and processed by the transaction device, allow the transaction device to identify the user device.

The persistent cookie may be received by the user device in block 560. After the persistent cookie has been received, the user device may then store the persistent cookie within a memory device. In block 570, transaction data associated with a transaction may be communicated by the user device to the transaction device. The transaction data may include the persistent cookie received by the user device. Additionally, the transaction data may include other information identifying the user device, including network address information, hard link information, and/or soft link information. Such other information identifying the user device may indicate the identity of the user device.

In block 580, the transaction device determines whether the transaction data includes the persistent cookie. If the persistent cookie is included, the transaction device may identify the persistent cookie within the transaction data and confirm the identity of the user device in block 590. In certain embodiments, if the user device identity is confirmed in block 590, the transaction may be confirmed to be valid. If the persistent cookie is not included within the transaction data, further confirmation of the identity of the user device may be performed in block 592. Such additional confirmation may include analysis of the network address information, hard link information, and/or soft link information, as well as, perhaps, human review. In certain embodiments, if the network address information, hard link information, and/or soft link information indicates that the user device is a device the transaction device previously had communications with that included the communication of a persistent cookie, and the persistent cookie is missing from the current transaction data, the identity of the user device may be automatically flagged for further review.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums and/or by one or more entities. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method, comprising:

accessing, by a computer system, transaction information associated with a request to conduct an electronic transaction, the transaction information including a first Internet Protocol Version 6 (IPv6) network address of a requesting device corresponding to the electronic transaction, one or more first hardware characteristics of the requesting device, and one or more first software characteristics of the requesting device, wherein the first IPv6 network address includes a first unique identifier for the requesting device;

accessing, by the computer system, stored data associated with a plurality of previously requested electronic transactions, the stored data including second IPv6 network address information, second hardware characteristic information, and second software characteristic information corresponding to a plurality of electronic devices associated with the plurality of previously requested electronic transactions, wherein the second IPv6 network address information includes a plurality of second unique identifiers for respective individual ones of the plurality of electronic devices associated with the plurality of previously requested electronic transactions;

determining, based on the transaction information including the first IPv6 network address of the requesting device, the one or more first hardware characteristics of the requesting device, and the one or more first software characteristics of the requesting device, and based on the stored data including the second IPv6 network address information, the second hardware characteristic information, and the second software characteristic information, a risk of approving the electronic transaction, wherein the determining is performed at least in part based on whether the first unique identifier for the requesting device is included in the plurality of second unique identifiers; and based on the determined risk of approving the electronic transaction, the computer system generating information indicating an approval or a denial of the electronic transaction.

2. The method of claim 1, wherein the requesting device is a smartphone, and wherein the one or more first software characteristics of the requesting device include information corresponding to a device model of the smartphone.

3. The method of claim 1, wherein the requesting device is a laptop computer, and wherein the one or more first software characteristics of the requesting device include information corresponding to an operating system of the laptop computer.

4. The method of claim 1, wherein the transaction information indicates that the first unique identifier for the requesting device is not included in the plurality of second unique identifiers.

5. The method of claim 1, further comprising:
the computer system issuing an approval of the electronic transaction.

6. The method of claim 5, wherein the transaction information indicates that the first unique identifier is included in the plurality of second unique identifiers; and
wherein issuing the approval is based on a previous transaction approval given to a specific one of the plurality of previously requested electronic transactions, wherein the previous transaction approval has previous transaction information that includes the first unique identifier.

7. The method of claim 1, wherein generating an approval or denial of the electronic transaction is based on a numeric score indicative of the risk of approving the electronic transaction.

8. The method of claim 1, wherein:
the one or more first hardware characteristics comprise a device identification (ID) of the device, an advertising ID that includes a cookie or a token, or a phone number of the device; or
the one or more first software characteristics comprise a browser type, an operating system type, an operating system language, a name of the device, or a model of the device.

9. A system comprising:
a processor; and
a non-transitory computer-readable medium having stored thereon instructions that are executable by the processor to cause the system to perform operations comprising:
receiving transaction information associated with a request to conduct an electronic transaction, the transaction information including a first Internet Protocol Version 6 (IPv6) network address of a requesting device corresponding to the electronic transaction, one or more first hardware characteristics of the requesting device, and one or more first software characteristics of the requesting device, wherein the first IPv6 network address includes a first unique identifier for the requesting device;

accessing stored data associated with a plurality of previously requested electronic transactions, the stored data including second IPv6 network address information, second hardware characteristic information, and second software characteristic information corresponding to a plurality of electronic devices associated with the plurality of previously requested electronic transactions, wherein the second IPv6 network address information includes a plurality of second unique identifiers for respective individual ones of the plurality of electronic devices associated with the plurality of previously requested electronic transactions;

determining, based on the transaction information including the first IPv6 network address of the requesting device, the one or more first hardware characteristics of the requesting device, and the one or more first software characteristics of the requesting device, and based on the stored data including the second IPv6 network address information, the second hardware characteristic information, and the second software characteristic information, a risk of approving the electronic transaction, wherein the determining is performed at least in part based on whether the first unique identifier for the requesting device is included in the plurality of second unique identifiers; and based on the determined risk, generating information indicating an approval or a denial of the request to conduct the electronic transaction.

10. The system of claim 9, wherein the requesting device is a smartphone, and wherein the one or more first software characteristics of the requesting device include information corresponding to a device model of the smartphone.

11. The system of claim 9, wherein the requesting device is a laptop computer, and wherein the one or more first software characteristics of the requesting device include information corresponding to an operating system of the laptop computer.

12. The system of claim 9, wherein the transaction information indicates that the first unique identifier for the requesting device is not included in the plurality of second unique identifiers.

13. The system of claim 9, wherein the transaction information indicates that the first unique identifier is included in the plurality of second unique identifiers; and
wherein issuing the approval is based on a previous transaction approval given to a specific one of the plurality of previously requested electronic transactions, wherein the previous transaction approval has previous transaction information that includes the first unique identifier.

14. The system of claim 9, wherein:
the one or more first hardware characteristics comprise a device identification (ID) of the device, an advertising ID that includes a cookie or a token, or a phone number of the device; or
the one or more first software characteristics comprise a browser type, an operating system type, an operating system language, a name of the device, or a model of the device.

15. A non-transitory computer-readable medium have stored thereon computer-executable instructions are executable by a processor to cause a computer system to perform operations comprising:

subsequent to an electronic transaction being initiated by a user, receiving transaction information associated with the electronic transaction, the transaction information including a first Internet Protocol Version 6 (IPv6) network address of a requesting device corresponding to the electronic transaction, one or more first hardware characteristics of the requesting device, and one or more first software characteristics of the requesting device, wherein the first IPv6 network address includes a first unique identifier for the requesting device;

accessing stored data associated with a plurality of previously requested electronic transactions, the stored data including second IPv6 network address information, second hardware characteristic information, and second software characteristic information corresponding to a plurality of electronic devices associated with the plurality of previously requested electronic transactions, wherein the second IPv6 network address information includes a plurality of second unique identifiers for respective individual ones of the plurality of electronic devices associated with the plurality of previously requested electronic transactions;

determining, based on the transaction information including the first IPv6 network address of the requesting device, the one or more first hardware characteristics of the requesting device, and the one or more first software characteristics of the requesting device, and based on the stored data including the second IPv6 network address information, the second hardware characteristic information, and the second software characteristic information, a risk of approving the electronic transaction, wherein the determining is performed at least in part based on whether the first unique identifier for the requesting device is included in the plurality of second unique identifiers; and based on the determined risk, generating risk assessment score information indicative of an approval or a denial of the electronic transaction.

16. The non-transitory computer-readable medium of claim 15, wherein the transaction information indicates the requesting device as a smartphone, and wherein the one or more first software characteristics of the requesting device include information corresponding to a physical aspect of the smartphone.

17. The non-transitory computer-readable medium of claim 15, wherein the requesting device is a laptop computer, and wherein the one or more first software characteristics of the requesting device include information corresponding to an operating system of the laptop computer.

18. The non-transitory computer-readable medium of claim 15, wherein:
the one or more first hardware characteristics comprise a device identification (ID) of the device, an advertising ID that includes a cookie or a token, or a phone number of the device; or
the one or more first software characteristics comprise a browser type, an operating system type, an operating system language, a name of the device, or a model of the device.

19. The non-transitory computer-readable medium of claim 15, wherein generating the risk assessment score information is based on a user account of the user, the user account corresponding to an electronic transaction service.

20. The non-transitory computer-readable medium of claim 15, wherein generating the risk assessment score information comprises generating a numeric risk score.

* * * * *